United States Patent [19]

Kondo et al.

[11] Patent Number: 5,053,467

[45] Date of Patent: Oct. 1, 1991

[54] PROCESS FOR PREPARATION OF STEREOREGULAR POLYOLEFINS

[75] Inventors: Yozo Kondo, Yokkaichi; Mitsuhiro Mori, Nakashima; Toshikazu Chikusa, Yokkaichi, all of Japan

[73] Assignee: Tosoh Corporation, Shinnanyo, Japan

[21] Appl. No.: 524,671

[22] PCT Filed: Jun. 23, 1987

[86] PCT No.: PCT/JP87/00410

§ 371 Date: Feb. 19, 1988

§ 102(e) Date: Feb. 19, 1988

[87] PCT Pub. No.: WO87/07899

PCT Pub. Date: Dec. 30, 1987

Related U.S. Application Data

[63] Continuation of Ser. No. 167,855, Feb. 19, 1988, abandoned.

[30] Foreign Application Priority Data

Jun. 23, 1986 [JP] Japan ................... 61-144893

[51] Int. Cl.$^5$ .................. C08F 4/651; C08F 4/654; C08F 10/00
[52] U.S. Cl. .................... 526/119; 502/125; 526/124; 526/142; 526/348; 526/351; 526/909
[58] Field of Search ............. 526/119, 124, 128

[56] References Cited

U.S. PATENT DOCUMENTS 4,315,874  2/1982  Ushida et al. ............. 526/125
4,394,291  7/1983  Hawley .................... 526/119

FOREIGN PATENT DOCUMENTS 52-127494  10/1977  Japan .
59-58005    4/1984  Japan .
2111066     6/1983  United Kingdom .

Primary Examiner—Edward L. Smith
Attorney, Agent, or Firm—Cushman, Darby & Cushman

[57] ABSTRACT

A catalyst comprising (A) a solid catalyst component obained by reacting a homogeneous solution containing (i) at least one member selected from the group consisting of a combination of metallic magnesium and a hydroxyl organic compound, and an oxygen-containing organic compound of magnesium, (ii) an electron donor compound and (iii) an oxygen-containing organic compound of titanium with (iv) at least one aluminum halide compound and further reacting the obtained solid product with (v) an electron donor compound and (vi) a titanium halide compound, (B) at least one member selected from the group consisting of organic metal compounds of metals of the groups Ia, IIa, IIb, IIIb and IVb of the periodic table, and (C) an electron donor compound, is valuable as the catalyst for preparing a stereoregular polyolefin by homopolymerization or copolymerization of an α-olefin having at least 3 carbon atoms.

This catalyst has a high polymerization activity, and the obtained polymer has a high stereoregularity and good powder characteristics.

10 Claims, No Drawings

PROCESS FOR PREPARATION OF STEREOREGULAR POLYOLEFINS

This is a continuation of Application No. 07/167,855, filed on Feb. 19, 1988 now abandoned.

TECHNICAL FIELD

The present invention relates to a process for the preparation of polyolefins. More particularly, the present invention relates to a process for the polymerization of an α-olefin having at least 3 carbon atoms (including the copolymerization of this α-olefin with other α-olefin), in which a highly stereoregular polymer having a good particle shape is obtained at a high yield.

BACKGROUND ART

Known conventional catalysts for the polymerization of olefins are an α-type titanium trichloride obtained by reducing titanium tetrachloride with hydrogen, violet γ-type titanium trichloride obtained by reducing titanium tetrachloride with aluminum, and δ-type titanium trichloride obtained by pulverizing this titanium trichloride with a ball mill. Furthermore, as the means for modifying these catalysts, methods are known in which these catalysts are mixed and pulverized with various modifiers. However, where the polymerization is carried out by using these catalysts, the polymerization activity is low and the catalysts remain in large quantities in the formed polymers, and therefore, the ash-removing step must be carried out. Recently, many proposals have been made on the preparation of solid catalyst components composed mainly of magnesium, titanium, and a halogen. In most of these proposals, however, the activity, the stereoregularity of the formed polymer, or the powder characteristic are still unsatisfactory, and further improvements are desired.

The present inventors previously proposed high-activity catalysts for the polymerization of olefins, in Japanese Examined Patent Publication No. 52-15110. In this proposal, a catalyst system having a high activity comprises (A) a catalyst component obtained by reacting metallic magnesium and a hydroxyl organic compound or an oxygen-containing compound of magnesium or the like with an oxygen-containing compound of a transition metal and an aluminum halide and (B) a catalyst component composed of an organic metal compound.

Polymer particles obtained in the presence of this catalyst have a small average particle or a broad particle size distribution, the proportion of fine particles contained in the polymer particles is large, and therefore the obtained polymer still has unsatisfactory powder characteristics. Moreover, this catalyst system is disadvantageous in that, when an α-olefin having at least 3 carbon atoms is polymerized, the ratio of formation of a stereoregular polymer is low.

The inventors carried out further research, and proposed a process for the preparation of a copolymer of ethylene with an α-olefin having at least 3 carbon atoms in Japanese Unexamined Patent Publication No. 59-58005. According to this proposal, an ethylene copolymer is obtained in a high yield by using a catalyst system comprising (A) a catalyst component obtained by reacting metallic magnesium and a hydroxyl organic compound or an oxygen-containing organic compound of magnesium or halogen-containing organic magnesium compound with an oxygen-containing organic compound of titanium or vanadium, a silicon compound, an aluminum halide compound, and a titanium tetrahalide, and (B) a catalyst component composed of an organometallic compound.

However, when an α-olefin having at least 3 carbon atoms is polymerized by using this catalyst, the obtained polymer has unsatisfactory powder characteristics and stereoregularity, and the polymerization activity is too low.

Therefore, the present inventors carried out research into the development of a process capable of providing a highly stereoregular polymer having good powder characteristics at a high yield by the polymerization of an α-olefin, especially an α-olefin having at least 3 carbon atoms.

DISCLOSURE OF THE INVENTION

It was found that a highly stereoregular polymer can be obtained at a high yield by carrying out the polymerization of an α-olefin having at least 3 carbon atoms by using a solid catalyst component obtained by reacting a homogeneous solution containing magnesium, titanium, and an electron donor compound, with an aluminum halide compound, to form particles, and reacting the particles with an electron donor compound and then with a titanium halide compound, and further, using an organometallic compound as an assistant and an electron donor compound. The present invention was completed based on this finding.

More specifically, in accordance with the present invention, there is provided a process for preparing a stereoregular polyolefin by polymerizing an α-olefin having at least 3 carbon atoms in the presence of a catalyst comprising a transition metal compound and an organometallic compound, wherein a catalyst system comprising (A) a solid catalyst component obtained by reacting a homogeneous solution containing (i) at least one member selected from the group consisting of a combination of metallic magnesium and a hydroxyl organic compound and an oxygen-containing organic compound of magnesium, (ii) an electron donor compound and (iii) an oxygen-containing organic compound of titanium with (iv) at least one aluminum halide compound, and further, reacting the obtained solid product with (v) an electron donor compound and (vi) a titanium halide compound, (B) at least one member selected from the group consisting of organometallic compounds of metals of the groups Ia, IIa, IIb, IIIb and IVb of the periodic table, and (C) an electron donor compound is used.

BEST MODE FOR CARRYING OUT THE INVENTION

A combination of metallic magnesium and a hydroxyl compound and an oxygen-containing organic compound of magnesium, used as the reactant (i) in the present invention, will now be described.

Where metallic magnesium and a hydroxyl organic compound are used in combination, metallic magnesium in the form of any of a powder, a particle, a foil, and a ribbon can be used, and an alcohol, an organic silanol, and a phenol are preferably used as the hydroxyl organic compound.

Linear or branched aliphatic alcohols, alicyclic alcohols and aromatic alcohols, which have 1 to 18 carbon atoms, can be used as the alcohol. For example, there can be mentioned methanol, ethanol, n-propanol, i-propanol, n-butanol, i-butanol, n-hexanol, 2-ethylhexanol, n-octanol, i-octanol, n-stearyl alcohol, cyclopentanol, cyclohexanol, and ethylene glycol. Silanols having at least one hydroxyl group, and as the organic group, a hydrocarbon group selected from the group consisting of alkyl, cycloalkyl, arylalkyl, aryl, and alkylaryl groups having 1 to 12 carbon atoms, preferably 1 to 6 carbon atoms, are used as the silanol. For example, as the organic silanol, there can be mentioned trimethylsilanol, triethylsilanol, triphenylsilanol, and t-butyldimethylsilanol. As the phenol, there can be mentioned phenol, cresol, xylenol, and hydroquinone.

These hydroxyl organic compounds are used singly or in the form of a mixture of two or more thereof.

Where the solid catalyst component (A) used in the present invention is obtained by using metallic magnesium, to promote the reaction, preferably at least one substance selected from the group consisting of substances capable of reacting with metallic magnesium and substances capable of forming an addition product with metallic magnesium, for example, polar substances such as iodine, mercuric chloride, alkyl halides, and organic acids, is added.

As the oxygen-containing organic compound of magnesium, there can be mentioned magnesium alkoxides such as magnesium methylate, magnesium ethylate, magnesium isopropylate, magnesium decanolate, magnesium methoxyethylate, and magnesium cyclohexanolate; magnesium alkylalkoxides such as magnesium ethylethylate; magnesium hydroalkoxides such as magnesium hydroxymethylate; magnesium phenoxides such as magnesium phenolate, magnesium naphthanate, magnesium phenanthrenate, and magnesium cresolate; magnesium carboxylates such as magnesium acetate, magnesium stearate, magnesium benzoate, magnesium phenylacetate, magnesium adipate, magnesium sebacate, magnesium phthalate, magnesium acrylate, and magnesium oleate; magnesium oximates such as magnesium butyloxymate, magnesium dimethylglyoximate, and cyclohexyloximate; hydroxamic acid salts of magnesium; hydroxyamine salts of magnesium such as an N-ethoroso-N-phenyl-hydroxylamine derivative of magnesium; magnesium enolates such as magnesium acetylacetonate; magnesium silanolates such as magnesium triphenylsilanolate; and, complex alkoxides of magnesium and other metals such as Mg[Al(OC$_2$H$_5$)$_4$]$_2$. These oxygen-containing organic compounds of magnesium are used singly or in the form of a mixture of two or more thereof.

As the electron donor compound used as the reactant (ii), there can be mentioned ethers, esters, ketones, phenols, amines, amides, imines, nitriles, phosphines, phosphites, stibines, arsines, phosphoramides, and alcoholates. Of these electron donor compounds, esters are preferred, and organic acid esters are most preferred. As the organic acid ester, there can be mentioned mono- and di-esters of aromatic carboxylic acids and mono- and di-esters of aliphatic carboxylic acids. As specific examples, there can be mentioned butyl formate, ethyl acetate, butyl acetate, isobutyl isobutyrate, propyl pivalate, isobutyl pivalate, ethyl acrylate, methyl methacrylate, ethyl methacrylate, isobutyl methacrylate, diethyl malonate, diisobutyl malonate, diethyl succinate, dibutyl succinate, diisobutyl succinate, diethyl glutalate, dibutyl glutalate, diisobutyl glutalate, diisobutyl adipate, dibutyl sebacate, diethyl maleate, dibutyl maleate, diisobutyl maleate, monomethyl fumarate, diethyl fumarate, diisobutyl fumarate, diethyl tartrate, dibutyl tartrate, diisobutyl tartrate, methyl benzoate, ethyl benzoate, methyl p-toluylate, ethyl p-tertbutylbenzoate, ethyl p-anisate, ethyl α-naphthoate, isobutyl α-naphthoate, ethyl cinnamate, monomethyl phthalate, dibutyl phthalate, diisobutyl phthalate, dihexyl phthalate, dioctyl phthalate, di-2-ethylhexyl phthalate, diallyl phthalate, diphenyl phthalate, diethyl isophthalate, diisobutyl isophthalate, diethyl terephthalate, dibutyl terephthalate, diethyl naphthalate, and dibutyl naphthalate. These electron donor compounds (ii) are used singly or in the form of a mixture of two or more thereof.

In accordance with one preferred embodiment of the present invention, in addition to the above-mentioned components (i) and (ii) and the titanium compound (iii), (vii) at least one silicon compound selected from the group consisting of polysiloxanes and silanes is used. By using the silicon compound, the powder characteristics of obtained polymer particles are improved.

The compound described below can be used as at least one silicon compound (vii) selected from the group consisting of polysiloxanes and silanes.

As the polysiloxane, there can be mentioned chain, cyclic, and three-dimensional siloxane polymers containing at least one kind of recurring units represented by the following formula at various ratios and distributions in one molecule:

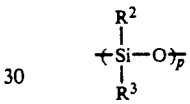

wherein R$^2$ and R$^3$, which may be the same or different, stand for an atom or residue capable of being bonded to silicon, such as a hydrocarbon group, for example, an alkyl or aryl group having 1 to 12 carbon atoms, a hydrogen atom, an alkoxy or aryloxy group having 1 to 12 carbon atoms or a fatty acid residue, and p is generally an integer of from 2 to 10,000, with the proviso that the case where all of R$^2$ and R$^3$ are hydrogen atoms is excluded.

As specific examples, there can be mentioned chain polysiloxanes such as hexamethyldisiloxane, octamethyltrisiloxane, dimethylpolysiloxane, diethylpolysiloxane, methylethylpolysiloxane, methylhydropolysiloxane, ethylhydropolysiloxane, butylhydropolysiloxane, hexaphenyldisiloxane, octaphenyltrisiloxane, diphenylpolysiloxane, phenylhydropolysiloxane, methylphenylpolysiloxane, dimethoxypolysiloxane, diethoxypolysiloxane, and diphenoxypolysiloxane, and cyclic polysiloxanes such as hexamethylcyclotrisiloxane, octamethylcyclotetrasiloxane, decamethylcyclopentasiloxane, 2,4,6-trimethylcyclotrisiloxane, 2,4,6,8-tetramethylcyclotetrasiloxane, triphenyltrimethylcyclotrisiloxane, tetraphenyltetramethylcyclotetrasiloxane, hexaphenylcyclotrisiloxane, and octaphenylcyclotetrasiloxane.

As the polysiloxane having a three-dimensional structure, there can be mentioned, for example, products having a crosslinked structure, which are obtained by crosslinking the above-mentioned chain and cyclic polysiloxanes by heating or other means.

From the viewpoint of handling ease, preferably the polysiloxane is liquid, and preferably the viscosity of the liquid polysiloxane as measured at 25° C. is 1 to 10,000 cst, especially 1 to 1,000 cst. However, the polysiloxane is not limited to a liquid polysiloxane, and a solid such as a silicone grease may be used.

As the silane, there can be mentioned silicon compounds represented by the following general formula:

$$H_qSi_rR^4_s$$

wherein $R^4$ stands for a group capable of being bonded to silicon, such as a hydrocarbon group such as an alkyl or aryl group having 1 to 12 carbon atoms, an alkoxy or aryloxy group having 1 to 12 carbon atoms or a fatty acid residue, groups $R^4$ may be the same or different, q and s are integers of at least 0, r is a natural number, and the requirement of $q+s=2r+2$ is satisfied.

As specific examples, there can be mentioned silane hydrocarbons such as trimethylphenylsilane and allyltrimethylsilane; chain and cyclic organic silanes such as hexamethyldisilane and octaphenylcyclotetrasilane; organic silanes such as methylsilane, dimethylsilane, and trimethylsilane; alkoxysilanes such as trimethylmethoxysilane, dimethyldiethoxydisilane, tetramethoxysilane, triphenylethoxysilane, tetramethyldiethoxysilane, and dimethyltetraethoxydisilane; and silane compounds containing a fatty acid residue, such as trimethylacetoxysilane, diethyldiacetoxysilane, and ethyltriacetoxysilane.

The above-mentioned silicon compounds can be used singly or in the form of a mixture or reaction product of two or more thereof.

As the oxygen-containing organic compound of titanium as the reactant (iii), there can be mentioned compounds represented by the following general formula:

$$[TiO_a(OR^5)_b]_m$$

wherein $R^5$ stands for a hydrocarbon group such as a linear or branched alkyl, cycloalkyl, arylalkyl, aryl or alkylaryl group having 1 to 20 carbon atoms, preferably 1 to 10 carbon atoms, a and b are numbers satisfying the requirements of $a \geq 0$ and $b > 0$ and compatible with the valency of titanium, and m is an integer.

Preferably, an oxygen-containing compound of the above general formula in which a is 0 or 1 and m is in the range of from 1 to 6 is used.

As specific examples, there can be mentioned titanium tetraethoxide, titanium tetra-n-propoxide, titanium tetra-i-propoxide, titanium tetra-n-butoxide, and hexa-i-propoxy dititanate. The use of an oxygen-containing organic compound of titanium having several different hydrocarbon groups is included within the scope of the present invention.

These oxygen-containing organic compounds of titanium can be used singly or in the form of a mixture of two or more thereof.

As the aluminum halide as the reactant (iv), there can be used compounds represented by the following general formula:

$$AlR^1_nX_{3-n}$$

wherein $R^1$ stands for a hydrocarbon group having 1 to 20 carbon atoms, X stands for a halogen atom and m is number of $0 > n \geq 2$.

Preferably, $R^1$ is selected from the group consisting of linear and branched alkyl, alkoxy, cycloalkyl, arylalkyl, aryl, and alkylaryl groups.

These aluminum halide compounds can be used singly or in the form of a mixture of two or more thereof. As specific examples of the aluminum halide compound, there can be mentioned ethyl aluminum dichloride, n-propyl aluminum dichloride, butyl aluminum dichloride, i-butyl aluminum dichloride, sesquiethyl aluminum chloride, sesquiisobutyl aluminum chloride, sesqui-i-propyl aluminum chloride, sesqui-n-propyl aluminum chloride, diethyl aluminum chloride, di-i-propyl aluminum chloride, di-n-propyl aluminum chloride, di-i-butyl aluminum chloride, diethyl aluminum bromide, and diethyl aluminum iodide.

Compounds mentioned above as the reactant (ii) can be used as the electron donor compound as the reactant (v). The electron donor compounds (v) can be used singly or in the form of a mixture of two or more thereof. The electron donor compound (v) may be the same as or different from the electron donor compound (ii).

As the titanium halide compound as the reactant (vi), there are used titanium compounds represented by the following general formula:

$$Ti(OR^6)_tX_{4-t}$$

wherein $R^6$ stands for a hydrocarbon group having 1 to 20 carbon atoms, X stands for a halogen atom and t is a number of $0 > t \geq 4$.

Preferably, $R^6$ is selected from the group consisting of linear and branched alkyl, alkoxy, cycloalkyl, arylalkyl, aryl, and alkylaryl groups.

These titanium halide compounds can be used singly or in the form of a mixture of two or more thereof. As specific examples of the titanium halide compound, there can be mentioned titanium tetrachloride, ethoxytitanium trichloride, propoxytitanium trichloride, butoxytitanium trichloride, phenoxytitanium trichloride, diethoxytitanium dichloride, and triethoxytitanium chloride.

In accordance with another preferred embodiment of the present invention, in addition to the electron donor compound (v) and titanium halide compound (vi) to be reacted with the solid product, (viii) a surface active agent is used. By using the surface active agent (viii), the powder characteristics of the obtained polymer particles are improved.

As the surface active agent, there can be mentioned an anionic surface active agent, a cationic surface active agent, a non-ionic surface active agent, and an amphoteric surface active agent, and a non-ionic surface active agent is most preferred. As the nonionic surface active agent, there can be mentioned polyoxyethylene alkyl ethers such as polyoxyethylene lauryl ether, polyoxyethylene cetyl ether, polyoxyethylene stearyl ether, polyoxyethylene oleyl ether, and polyoxyethylene polyhydric alcohol ethers; polyoxyethylene alkyl aryl ethers such as polyoxyethylene octyl phenyl ether, and polyoxyethylene nonyl phenyl ether; esters of polyhydric alcohols having 2 to 12 carbon atoms with fatty acids having 12 to 18 carbon atoms, such as sorbitan fatty acid ester, ethylene glycol fatty acid ester, diethylene glycol fatty acid ester, propylene glycol fatty acid ester, and glycerol fatty acid ester; and, polyoxyethylene alkylamines. Of these non-ionic surface active agents, a sorbitan fatty acid ester is especially preferred. As the sorbitan fatty acid ester, there can be mentioned, for example, sorbitan monolaurate, sorbitan monopalmitate, sorbitan monostearate, sorbitan tristearate, sorbitan monooleate, sorbitan sesquioleate, and sorbitan distearate.

Furthermore, a fluorine-containing surface active agent can be used. As the fluorine-containing surface active agent, there can be mentioned non-ionic perfluoroalkyl ethylene oxide adducts. The surface active agents can be used singly or in the form of a mixture of two or more thereof.

The solid catalyst component of the present invention is prepared by reacting the reactant (i) with the reactants (ii) and (iii), reacting the obtained reaction product with the reactant (iv), and reacting the obtained solid product with the reactants (v) and (vi). In accordance with one preferred embodiment, the reactant (vii) is used in the reaction of the reactant (i) with the reactants (ii) and (iii), and in accordance with another preferred embodiment, the reactant (viii) is used in the reaction of the solid product with the reactants (v) and (vi).

Preferably, these reactions are carried out in a liquid medium. Where the reactants per se are not liquid under operation conditions or the amount of the liquid reactants is insufficient, the reactions should be carried out in the presence of an inert organic solvent. All inert organic solvents ordinarily used in the art can be used. For example, there can be mentioned aliphatic, alicyclic, and aromatic hydrocarbons, halogen derivatives thereof, and mixtures thereof. As specific examples, there can be mentioned isobutane, hexane, heptane, cyclohexane, benzene, toluene, xylene, monochlorobenzene, benzyl chloride, methylene dichloride, 1,2-dichloroethane, 1,3-dichloropropane, 1,4-dichlorobutane, trichloroethane, tetrachloroethane, tetrachloroethylene, carbon tetrachloride, and chloroform. These organic solvents can be used singly or in the form of a mixture thereof. When a halogen derivative or a mixture is used, sometimes a good effect is obtained with respect to the polymerization activity or the stereoregularity of the polymer.

In the present invention, the amounts of the reactants (i), (ii), (iii), (iv), (v) and (vi) used are not particularly critical. However, preferably the amounts of the reactants used are selected so that the ratio of the magnesium atom (i) to the titanium atom (iii) is from 1/0.01 to 1/20, especially from 1/0.1 to 1/5, and the molar ratio of the magnesium atom to the electron donor compound (ii) or (iv) is from 1/0.05 to 1/1.0, especially from 1/0.1 to 1/0.5. If the ratios are outside the above-mentioned ranges, a problem arises of a low polymerization activity or a low stereoregularity. Also, preferably the amounts of the reactants used are selected so that the ratio of the magnesium atom to the aluminum atom in the aluminum halide compound (iv) is from 1/0.1 to 1/100, especially from 1/1 to 1/20, especially preferably, from 1/1 to 1/5. If the ratio is outside this range and the proportion of the aluminum atom is too large, the catalyst activity is lowered, and if the proportion of the aluminum atom is too small, good powder characteristics cannot be obtained. Moreover, preferably the amounts of the reactants used are selected so that the ratio of the magnesium atom (i) to the titanium atom (iv) is from 1/1 to 1/100, especially from 1/3 to 1/50. If the ratio is outside the above-mentioned range, a problem arises of a reduction of the polymerization activity and thus a discoloration of the product.

To improve the powder characteristics, preferably the silicon compound (vii) is used. When the silicon compound (vii) is used, preferably the ratio of the magnesium atom to the silicon atom in the silicon compound (vii) is not larger than 1/20, especially not larger than 1/5. If the ratio is outside this range, the polymerization activity is reduced or the powder characteristics are not improved.

To improve the powder characteristics, preferably the surface active agent (viii) is used. When the surface active agent is not used, often, upon the reaction of the solid product with the reactants (v) and (vi), particles of the solid product agglomerate and the improvement of properties of particles of the solid catalyst component (A) and in turn, the improvement of the powder characteristics of polymer particles, cannot be expected. The amount of the surface active agent used is smaller than 50,000 ppm, preferably 50 to 50,000 ppm, especially preferably from 100 to 10,000 ppm, based on the total reactants. If the amount of the surface active agent used is outside the above-mentioned range and is too large, a problem arises of a reduction of the polymerization activity and thus a discoloration of the product. If the amount of the surface active agent used is appropriate, the polymerization activity or stereoregularity is often improved.

The preparation of a homogeneous solution of the reactants (i), (ii) and (iii) or the reactants (i), (ii), (iii) and (vii) is carried out at a temperature of $-50$ to 300° C., preferably 0 to 200° C., for 0.5 to 50 hours, preferably 1 to 6 hours, in an inert gas atmosphere under atmospheric pressure or an elevated pressure. The reaction with the reactants (iv), (v) and (vi) or the reactants (iv), (v), (vi) and (viii) for the preparation of the solid catalyst component is carried out at a temperature of $-50$ to 200° C., preferably $-30°$ to 100° C., for 0.2 to 50 hours, preferably 0.5 to 5 hours, in an inert gas atmosphere or under an elevated pressure.

The reactant (vi) may be subjected to a stepwise reaction in a plurality of stages. In this case, an effect of increasing the polymerization activity is often attained by an increase of the Ti content in the catalyst component.

The so-obtained catalyst component (A) can be directly used, but in general, the solid catalyst component (A) is used after the residual unreacted substances and by-products are removed by filtration or decantation, the solid catalyst component is washed with an inert organic solvent several times, and the solid catalyst component is suspended in an inert organic solvent. Furthermore, a product obtained by isolating the solid catalyst component after washing and heating the isolated solid catalyst component under a reduced pressure or atmospheric pressure to remove the inert organic solvent, can be used.

The so-obtained solid catalyst component (A) is combined with the organometallic compound of a metal of the group Ia, IIa, IIb, IIIb or IVb of the periodic table as the component (B) and the electron donor compound as the component (C) for the use in the polymerization of olefins.

As the organometallic compound (B), there can be mentioned organic metal compounds comprising a metal such as lithium, magnesium, zinc, tin or aluminum, and an organic group.

An alkyl group can be mentioned as a typical instance of the organic group. Linear and branched alkyl groups having 1 to 20 carbon atoms can be used as the alkyl group. As specific examples of the organometallic compound, there can be mentioned n-butyl lithium, diethyl magnesium, diethyl zinc, trimethyl aluminum, triethyl aluminum, tri-i-butyl aluminum, tri-n-butyl aluminum, tri-n-decyl aluminum, tetraethyl tin, and tetrabutyl tin. A trialkyl aluminum compound having a linear or branched alkyl group having 1 to 10 carbon atoms is especially preferred. Furthermore, alkyl metal halides having an alkyl group having 1 to 20 carbon atoms, such as ethyl aluminum sesquichloride, diethyl aluminum chloride and diisopropyl aluminum chloride, and alkyl metal alkoxides such as diethyl aluminum ethoxide can be used.

These organometallic compounds can be used singly or in the form of a mixture of two or more thereof. Of course, the organometallic compounds can be used singly, but if a mixture of two or more thereof is used, often special effects can be attained with respect to the polymerization activity, the stereoregularity of the polymer, and the powder characteristics.

As the electron donor compound (C), an organic acid ester, an oxygen-containing organic compound of silicon, and a nitrogen-containing organic compound are preferably used.

The compounds as mentioned above with respect to the reactants (ii) and (v) used for the preparation of the solid catalyst component (A) can be used as the organic acid ester. Among them, an aliphatic carboxylic acid ester and an aromatic carboxylic acid ester are preferred. As specific examples, there can be mentioned aliphatic carboxylic acid esters having 2 to 18 carbon atoms, such as ethyl acetate, propyl acetate, butyl acetate, ethyl propionate, butyl propionate, and ethyl butyrate; and aromatic carboxylic acid esters having 8 to 24 carbon atoms, such as methyl benzoate, ethyl benzoate, methyl toluylate, ethyl toluylate, methyl anisate, and ethyl anisate.

The organic acid esters can be used singly or in the form of a mixture or reaction product of two or more thereof.

Compounds having a hydrocarbon group having 1 to 12 carbon atoms, which is bonded to silicon through oxygen, can be used as the oxygen-containing organic compound of silicon.

As specific examples, there can be mentioned alkoxysilanes and aryloxysilanes such as trimethylmethoxysilane, trimethylethoxysilane, dimethylethoxysilane, trimethyl-i-propoxysilane, trimethyl-n-propoxysilane, trimethyl-t-butoxysilane, trimethyl-i-butoxysilane, trimethyl-n-butoxysilane, trimethyl-n-pentoxysilane, trimethylphenoxysilane, dimethyldimethoxysilane, methylphenyldimethoxysilane, diphenyldimethoxysilane, methyldimethoxysilane, dimethyldiethoxysilane, diethyldiethoxysilane, diphenyldiethoxysilane, methyldodecyldiethoxysilane, methyloctadecyldiethoxysilane, methylphenyldiethoxysilane, methyldiethoxysilane, dibenzyldiethoxysilane, diethoxysilane, dimethyldi-n-butoxysilane, dimethyldi-i-pentoxysilane, diethyldi-i-pentoxysilane, di-i-butyldii-pentoxysilane, diphenyldi-i-pentoxysilane, diphenyldin-octoxysilane, methyltrimethoxysilane, ethyltrimethoxysilane, n-butyltrimethoxysilane, phenyltrimethoxysilane, vinyltrimethoxysilane, chloromethyltrimethoxysilane, 3-chloropropyl-trimethoxysilane, 4-chlorophenyltrimethoxysilane, trimethoxysilane, methyltriethoxysilane, ethyltriethoxysilane, n-propyltriethoxysilane, n-butyltriethoxysilane, phenyltriethoxysilane, vinyltriethoxysilane, 3-aminopropyltriethoxysilane, triethoxysilane, ethyltrii-propoxysilane, vinyltri-i-propoxysilane, i-pentyltrin-butoxysilane, methyltri-i-pentoxysilane, ethyl-i-pentoxysilane, methyltri-n-hexoxysilane, phenyltri-i-pentoxysilane, tetramethoxysilane, tetraethoxysilane, tetra-i-propoxysilane, tetra-n-propoxysilane, tetra-n-butoxysilane, tetra-i-pentoxysilane, tetra-n-hexoxysilane, tetraphenoxysilane, tetramethyldiethoxydisilane, and dimethyltetraethoxydisilane; and haloalkoxysilanes and haloaryloxysilanes such as dichlorodiethoxysilane, dichlorodiphenoxysilane, and tribromoethoxysilane.

These oxygen-containing organic compounds of silicon can be used singly or in the form of a mixture or reaction product of two or more thereof.

Compounds containing a nitrogen atom in the molecule and capable of acting as a Lewis base can be used as the nitrogen-containing organic compound.

As specific examples, there can be mentioned amide compounds such as acetic N,N-dimethylamide, benzoic N,N-diethylamide, and toluylic N,N-dimethylamide; piperidine compounds such as 2,2,6,6-tetramethylpiperidine, 2,6-diisopropylpiperidine, 2,6-diisobutylpiperidine, 2,6-diisobutyl-4-methylpiperidine, 2,2,6-trimethylpiperidine, 2,2,6,6-tetraethylpiperidine, 1,2,2,6,6-pentamethylpiperidine, 2,2,6,6-tetramethyl-4-piperidyl benzoate, and bis(2,2,6,6-tetramethyl-4-piperidyl)sebacate; pyridine compounds such as 2,6-diisopropylpyridine, 2,6-diisobutylpyridine, and 2-isopropyl-6-methylpyridine; pyrrolidine compounds such as 2,2,5,5-tetramethylpyrrolidine, 2,5-diisopropylpyrrolidine, 2,2,5-trimethylpyrrolidine, 1,2,2,5,5-pentamethylpyrrolidine, and 2,5-diisobutylpyrrolidine; amine compounds such as trimethylamine, triethylamine, tributylamine, tribenzylamine, tetramethylethylenediamine, diisopropylethylamine, t-butyldimethylamine, diphenylamine, and di-o-tolylamine; and aniline compounds such as N,N-diethylaniline and N,N-diisopropylamine.

These nitrogen-containing organic compounds can be used singly or in the form of a mixture or reaction product of two or more thereof.

Preferably, the solid catalyst component (A) is used in an amount such that the amount of the titanium atom is 0.001 to 2.5 millimoles per liter of the reaction vessel.

The organometallic compound (B) is used at a concentration of 0.02 to 50 millimoles, preferably 0.2 to 5 millimoles, per liter of the reactor.

The electron donor compound as the component (C) is used at a concentration of 0.001 to 50 millimoles, preferably 0.01 to 5 millimoles, per liter of the reactor.

The mode of feeding the three components into the polymerization reactor is not particularly critical in the present invention. For example, a method can be adopted in which the components (A), (B) and (C) are independently fed into the polymerization reactor; a method in which the component (A) is placed in contact with the component (C) and then placed in contact with the component (B), and thereafter polymerization is carried out; a method in which the component (B) is placed in contact with the component (C) and then placed in contact with the component (A), and thereafter polymerization is carried out; and a method in which the component (A) is placed in contact with the components (B) and (C) in advance and polymerization is carried out.

Polymerization of an olefin is carried out in the gas phase or liquid phase at a reaction temperature lower than the melting point of the polymer.

Where polymerization is carried out in the liquid phase, the olefin per se can be used as the reaction medium, or an inert solvent can be used as the reaction medium. Any inert solvents customarily used in the art can be used. Alkanes and cycloalkanes having 4 to 20 carbon atoms, such as isobutane, pentane, hexane, and cyclohexane, are preferably used.

As the olefin to be polymerized in the process for the preparation of a polyolefin according to the present invention, there can be mentioned α-olefins represented by the general formula R—CH=CH$_2$, in which R stands for a linear or branched, substituted or unsubstituted alkyl group having 1 to 10 carbon atoms, especially 1 to 8 carbon atoms. As specific examples of the α-olefin, there can be mentioned propylene, 1-butene, 1-pentene, 4-methyl-1-pentene, and 1-octene. These α-olefins can be homopolymerized, random-copolymerized, and blockcopolymerized. In the copolymerization, at least two of the above-mentioned α-olefins or the α-olefin and a diene such as butadiene or isoprene are polymerized. Especially preferably, propylene alone; propylene and ethylene; propylene and the above-mentioned α-olefin other than propylene; or propylene and a diene are polymerized.

The polymerization reaction conditions are not particularly critical, so far as the reaction temperature is lower than the melting point of the polymer. In general, however, a reaction temperature of 20° to 110° C. and a reaction pressure of 2 to 50 kg/cm$^2$.G are selected.

Any reactor customarily used in the art can be appropriately used at the polymerization step. For example, a stirring tank type reactor, a fluidized bed type reactor, and a circulation type reactor can be used, and the polymerization can be carried out in a continuous manner, a semi-batchwise manner or a batchwise manner. Moreover, the polymerization can be performed in at least two stages having different reaction conditions.

The present invention will now be described in detail with reference to the following examples that by no means limit the scope of the invention.

Note, in the examples and comparative examples, the melt flow rate (hereinafter referred to as "MFR") was determined under the condition L of ASTM D-1238.

The isotactic index (hereinafter referred to as "II") was expressed by the ratio (% by weight) of the insoluble polymer left after extraction with n-heptane to the whole formed polymer.

The activity was expressed by the amount (g) of the polymer formed per gram of the solid catalyst component (A), and the Ti activity was expressed by the amount (g) of the polymer formed per gram of Ti contained in the solid catalyst component (A).

The particle size distribution of polymer particles was expressed by the common logarithm of the geometric standard deviation of determined by a known method from an approximate straight line obtained by plotting the results of a classification of polymer particles by sieves on a probability logarithmic paper. The common logarithm is hereinafter referred to as "συ. The average particle diameter was expressed by the particle diameter corresponding to the weight integrated value of 50% on the above-mentioned approximate straight line. The content of fine particles was expressed by the proportion (% by weight) of fine particles having a particle size smaller than 105 μm.

EXAMPLE 1

(a) Preparation of Solid Catalyst Component (A)

An autoclave having an inner capacity of 2 l and provided with a stirrer was charged with 12 g (0.49 mole) of metallic magnesium powder, and 0.6 g of iodine, 334.3 g (2.6 moles) of 2-ethylhexanol, 168.0 g (0.49 mole) of titanium tetrabutoxide and 14.8 g (0.099 mole) of ethyl benzoate were added thereto. Then, 1 l of decane was added to the mixture and the temperature was elevated to 90° C., and the mixture was stirred for 1 hour under sealing with nitrogen while removing generated hydrogen gas. Subsequently, the temperature was elevated to 140° C. and reaction was carried out for 1 hour to obtain a homogeneous solution containing magnesium and titanium (Mg-Ti solution).

A flask having an inner volume of 500 ml was charged with the Mg-Ti solution in an amount of 0.048 mole as calculated as Mg, the content was rapidly cooled to −20° C., and a solution obtained by diluting 14.9 g of i-butyl aluminum dichloride to a concentration of 50% with decane was added over a period of 2 hours. After completion of the addition, the temperature was elevated to room temperature to obtain a slurry containing a white solid product. Then, the temperature of the obtained slurry of the white solid product was elevated to 60° C., and 1.8 g (0.012 mole) of ethyl benzoate was added to the slurry. The mixture was then cooled to 45° C. and all of a solution obtained by diluting 47 ml of titanium tetrachloride with 47 ml of 1,2-dichloroethane was added to the mixture, a reaction was carried out for 4 hours, and the mixture was stirred at 70° C. for 1 hour. The solid portion was collected by filtering the reaction mixture, suspended in a mixture of 47 ml of titanium tetrachloride and 47 ml of 1,2-dichloroethane again, and the suspension stirred at 70° C. for 1 hour. Hexane was added to the formed product and washing was carried out until the free titanium compound could not be detected, and thus a slurry of the solid catalyst component (A) suspended in hexane was obtained. The supernatant was removed and the residue was dried in a nitrogen atmosphere, and an elementary analysis proved that the Ti content was 6.0% by weight.

(b) Polymerization of Propylene

The inner atmosphere of a stainless steel autoclave having an inner capacity of 2 l and provided with an electromagnetic stirrer was substituted with nitrogen, and the autoclave was charged in succession with 1.25 millimoles of triethyl aluminum as the catalyst component (B), 0.313 millimole of ethyl benzoate as the catalyst component (C), and 0.0063 millimole, as calculated as Ti, of the solid catalyst component (A) obtained in (a) above. The inner pressure of the autoclave was adjusted to 0.1 kg/cm$^2$.G and hydrogen was added to the autoclave in an amount corresponding to 0.2 kg/cm$^2$, and 0.5 kg of liquefied propylene was charged under pressure. Stirring was started and the inner temperature of the autoclave was elevated to 65° C. Propylene was polymerized at this temperature for 1.5 hours.

After termination of the polymerization reaction, stirring was stopped, unreacted propylene in the system was discharged, and the formed polymer was recovered. It was found that the amount of the formed polymer was 206 g, and the activity was 41,200 g/g, which corresponded to a Ti activity of 687 kg/g. When the properties of the polymer particles were measured, it was found that the MFR was 5.2, II was 96.5, the bulk density was 0.40 g/cm$^3$, the average particle diameter was 285 μm, σ was 0.16, and the fine particle content was 2.3% by weight.

EXAMPLES 2 THROUGH 5

Solid catalyst components (A) were prepared in the same manner as described in (a) of Example 1 except that a 50% decane solution of ethyl aluminum dichloride in Example 2, a 50% decane solution of ethyl aluminum sesquichloride in Example 3, a 50% 1,2-dichloroethane solution of i-butyl aluminum dichloride in Example 4, and a 50% 1,2-dichloroethane solution of diethyl aluminum chloride in Example 5 were used in amounts shown in Table 1, instead of the i-butyl aluminum dichloride used in (a) of Example 1.

Propylene was polymerized in the same manner as described in (b) of Example 1 by using the so-obtained solid catalyst components (A), respectively, and triethyl aluminum and ethyl benzoate. The obtained results are shown in Table 1.

COMPARATIVE EXAMPLE 1

By using the same apparatus as used in (a) of Example 1, an Mg-Ti solution was obtained under the same conditions as adopted in Example 1 except that ethyl benzoate was not used as the reactant. Then, a flask having a capacity of 500 ml was charged with the obtained Mg-Ti solution in an amount of 0.053 mole as calculated as Mg, the temperature was elevated to 45° C., and a 50% hexane solution of 82.2 g of ethyl aluminum dichloride was added over a period of 2 hours. After completion of the addition, the temperature was elevated to 70° C. and the mixture was stirred for 1 hour.

Hexane was added to the obtained product and washing was conducted 15 times by decantation to obtain a slurry of a solid catalyst component (A) suspended in a hexane. An elementary analysis proved that the titanium content was 18.0% by weight.

Propylene was polymerized by using the so-obtained solid catalyst component, triethyl aluminum and ethyl benzoate in the same manner as described in (b) of Example 1. The results are shown in Table 1.

COMPARATIVE EXAMPLE 2

By using the Mg-Ti solution obtained in Comparative Example 1 in an amount of 0.053 mole as calculated as Mg and a 50% hexane solution of 82.2 g of ethyl aluminum dichloride, a hexane slurry containing a solid product was prepared in the same manner as described in Comparative Example 1. Then, all of a solution formed by diluting 52.4 ml of titanium tetrachloride with 52.4 ml of 1,2-dichloroethane was added to the hexane slurry, a reaction was conducted for 4 hours, and the mixture was stirred at 70° C. for 1 hour. The solid portion was collected by filtering the reaction mixture. The solid portion was suspended in a mixture of 52.4 ml of titanium tetrachloride and 52.4 ml of 1,2-dichloroethane again, and the suspension was stirred at 70° C. for 1 hour.

Hexane was added to the product and washing was carried out 15 times by decantation to obtain a slurry of a solid catalyst component (A) suspended in hexane.

Propylene was polymerized by using the so-obtained solid catalyst component (A), triethyl aluminum and ethyl benzoate in the same manner as described in (b) of Example 1. The results are shown in Table 1.

COMPARATIVE EXAMPLE 3

To 0.049 mole, as calculated as Mg, of the Mg-Ti solution obtained in (a) of Example 1 was added 1.8 g of ethyl benzoate, and the mixture was stirred at 60° C. for 1 hour. All of a solution obtained by diluting 48.5 ml of titanium tetrachloride with 48.5 ml of 1,2-dichloroethane was added to the mixture, a reaction was carried out for 4 hours, and the mixture was stirred at 70° C. for 1 hour. The solid portion was collected by filtering the reaction mixture and was suspended in a mixture of 48.5 ml of titanium tetrachloride and 48.5 ml of 1,2-dichloroethane again, and the suspension was stirred at 70° C. for 1 hour.

Hexane was added to the obtained product and washing was conducted 15 times by decantation to obtain a slurry of a solid catalyst component (A) suspended in hexane.

Propylene was polymerized by using the so-obtained solid catalyst component (A), triethyl aluminum, and ethyl benzoate in the same manner as described in (b) of Example 1. The results are shown in Table 1.

COMPARATIVE EXAMPLE 4

To 0.048 mole, as calculated as Mg, of the Mg-Ti solution obtained in (a) of Example 1 was added i-butyl aluminum dichloride under the same conditions as described in (a) of Example 1 to obtain a slurry containing a white solid product. Then, a solid catalyst component (A) was prepared under the same conditions as described in (a) of Example 1 except that ethyl benzoate was not used.

Propylene was polymerized by using the so-obtained solid catalyst component (A), triethyl aluminum, and ethyl benzoate in the same manner as described in (b) of Example 1. The results are shown in Table 1.

TABLE 1

| | Aluminum halide compound as reactant (iv) | | Results of polymerization of propylene | | | | | | | |
|---|---|---|---|---|---|---|---|---|---|---|
| | Kind | Amount used (g) | Activity (g/g) | Ti activity (kg/g) | MFR (g/10 min) | II (%) | Bulk density (g/cm$^3$) | Average particle diameter ($\mu$m) | $\sigma$ | Fine particle content (%) |
| Example 1 | i-Butyl aluminum dichloride | 14.9 | 41,200 | 687 | 5.2 | 96.5 | 0.40 | 285 | 0.16 | 2.3 |
| Example 2 | Ethyl aluminum dichloride | 12.2 | 38,400 | 600 | 3.9 | 96.0 | 0.41 | 199 | 0.18 | 3.4 |
| Example 3 | Ethyl aluminum sesquichloride | 23.8 | 30,600 | 582 | 4.6 | 94.8 | 0.37 | 186 | 0.20 | 2.1 |
| Example 4 | i-Butyl aluminum dichloride | 14.9 | 35,600 | 660 | 4.2 | 97.5 | 0.38 | 268 | 0.15 | 3.7 |
| Example 5 | Diethyl aluminum chloride | 11.6 | 28,400 | 568 | 3.9 | 94.1 | 0.39 | 210 | 0.19 | 3.0 |
| Comparative Example 1 | Ethyl aluminum dichloride | 82.2 | 1,600 | 8.9 | 9.9 | 88.0 | 0.25 | 200 | 0.30 | 7.1 |
| Comparative Example 2 | Ethyl aluminum dichloride | 82.2 | 3,500 | 17.5 | 7.6 | 91.0 | 0.27 | 223 | 0.34 | 6.8 |
| Comparative Example 3 | — | — | 8,400 | 168 | 6.6 | 89.3 | 0.25 | 160 | 0.44 | 10.4 |
| Comparative Example 4 | i-Butyl aluminum dichloride | 14.9 | 21,000 | 125 | 5.4 | 93.0 | 0.27 | 215 | 0.37 | 6.5 |

EXAMPLES 6 THROUGH 9

Propylene was polymerized in the same manner as described in (b) of Example 1 by using the solid catalyst component (A) obtained in (a) of Example 1, 1.00 millimole of triethyl aluminum and 0.25 millimole of diethyl aluminum chloride as the catalyst component (B) and a catalyst component (C) shown in Table 2 while maintaining the inner temperature of the autoclave at 80° C. The results are shown in Table 2.

EXAMPLES 10 THROUGH 12

Solid catalyst components (A) were prepared in the same manner as described in Example 1 except that 2.6 moles of n-butanol in Example 10, 2.6 moles of n-octanol in Example 11 and 1.3 moles of n-butanol and 1.3 moles of i-propanol in Example 12 were used instead of 2-ethylhexanol used in (a) of Example 1.

Propylene was polymerized under the same conditions as described in (b) of Example 1 by using the so-obtained solid catalyst components (A), respectively, and triethyl aluminum and ethyl benzoate. The results are shown in Table 3.

continuously feeding propylene so that the total pressure was 10.4 kg/cm$^2$.G

In Example 13, polypropylene having an MFR of 2.1 and a bulk density of 0.38 was obtained, and in Example 14, polypropylene having an MFR of 1.9 and a bulk density of 0.41 was obtained.

EXAMPLE 15

(a) Preparation of Solid Catalyst Component (A)

An autoclave having a capacity of 2 l and provided with a stirrer was charged with 12 g (0.49 mole) of metallic magnesium powder, and 0.6 g of iodine, 334.3 g (2.6 moles) of 2-ethylhexanol, 168.0 g (0.49 mole) of titanium tetrabutoxide and 14.8 g (0.099 mole) of ethyl benzoate were added. Then, 1 l of decane was further added, the temperature was elevated to 90° C., and the mixture stirred for 1 hour under sealing with nitrogen while removing generated hydrogen gas. Subsequently, the temperature was elevated to 140° C. and a reaction was carried out for 1 hour. Then, 29.3 g (0.12 mole) of diphenyldimethoxysilane was added over a period of 30 minutes and the mixture was stirred at 140° C. for 1 hour to obtain a homogenous solution containing mag-

TABLE 2

| | Kind of catalyst component (C) | Results of polymerization of propylene | | | | | | | |
|---|---|---|---|---|---|---|---|---|---|
| | | Activity (g/g) | Ti activity (kg/g) | MFR (g/10 min) | II (%) | Bulk density (g/cm$^3$) | Average particle diameter (μm) | σ | Fine particle content (%) |
| Example 6 | Methyl p-toluylate | 37,600 | 626 | 5.0 | 95.6 | 0.38 | 237 | 0.19 | 1.6 |
| Example 7 | Ethyl p-anisate | 34,400 | 574 | 4.9 | 96.6 | 0.39 | 214 | 0.21 | 2.3 |
| Example 8 | Phenyltriethoxysilane | 33,800 | 562 | 4.8 | 97.3 | 0.40 | 198 | 0.15 | 3.6 |
| Example 9 | Diphenyldimethoxysilane | 44,200 | 738 | 4.6 | 98.5 | 0.42 | 211 | 0.14 | 4.6 |

TABLE 3

| | Kind of alcohol used for preparation of Mg—Ti solution | Results of polymerization of propylene | | | | | | | |
|---|---|---|---|---|---|---|---|---|---|
| | | Activity (g/g) | Ti activity (kg/g) | MFR (g/10 min) | II (%) | Bulk density (g/cm$^3$) | Average particle diameter (μm) | σ | Fine particle content (%) |
| Example 10 | n-Butanol | 31,800 | 650 | 3.9 | 95.3 | 0.37 | 375 | 0.14 | 1.6 |
| Example 11 | n-Octanol | 33,200 | 638 | 5.1 | 96.0 | 0.40 | 305 | 0.17 | 2.3 |
| Example 12 | n-Butanol and i-propanol | 35,600 | 742 | 7.2 | 94.5 | 0.39 | 278 | 0.14 | 0.9 |

EXAMPLES 13 AND 14

Polymerization was carried out in the gas phase by using the solid catalyst component (A) prepared in Example 1. A stainless steel autoclave having an inner capacity of 2 l and provided with an electromagnetic stirrer was charged with 50 g of polypropylene powder having a bulk density of 0.34 g/cm$^3$ and MFR of 6 g/10 min and deaeration drying was carried out at 70° C. for 2 hours. The inner atmosphere of the autoclave was sufficiently substituted with nitrogen, and the inner temperature was adjusted to 60° C. Then, triethyl aluminum as the catalyst component (B), ethyl benzoate in Example 13 or diphenyldimethoxysilane in Example 14 as the catalyst component (C) and the solid catalyst component (A) were sequentially added in the amounts described in (b) of Example 1. The inner pressure of the reactor was adjusted to 0.1 kg/cm$^2$.G and hydrogen was added in an amount corresponding to 0.3 kg/cm$^2$, and polymerization was carried out for 2 hours while nesium titanium and silicon (hereinafter referred to as "Mg-Ti solution").

A flask having an inner volume of 500 ml was charged with 0.048 mole, as calculated as Mg, of the Mg-Ti solution, and the content was rapidly cooled to −20° C. and a solution formed by diluting 14.9 g of i-butyl aluminum dichloride to a concentration of 50% with decane was added over a period of 2 hours. After completion of the addition, the temperature was elevated to room temperature to obtain a slurry containing a white solid product. The temperature of the slurry containing the white solid product was elevated to 60° C. and 1.8 g (0.012 mole) of ethyl benzoate was added. Then, the mixture was cooled to 45° C. and all of a solution formed by diluting 47 ml of titanium tetrachloride with 47 ml of 1,2-dichloroethane was added to the mixture, a reaction was carried out for 4 hours, and the mixture was stirred at 70° C. for 1 hour. The solid portion was collected by filtering the reaction mixture and was suspended in a mixture of 47 ml of titanium tetrachloride and 47 ml of 1,2-dichloroethane again, and the mixture was stirred at 70° C. for 1 hour. Hexane was added to the reaction product and washing was conducted until the free titanium compound could not be detected, whereby a slurry of a solid catalyst component (A) suspended in hexane was obtained. The supernatant was removed and the residue was dried in a nitrogen atmosphere. An elementary analysis proved that the Ti content was 4.3% by weight.

(b) Polymerization of Propylene

The inner atmosphere of a stainless steel autoclave having an inner volume of 2 l and provided with an electromagnetic stirrer was substituted with nitrogen, and 1.25 millimoles of triethyl aluminum as the catalyst component (B), 0.313 millimole of ethyl benzoate as the catalyst component (C) and 0.0063 millimole, as calculated as Ti, of the solid catalyst component (A) obtained in (a) above were charged in sequence into the autoclave. The inner pressure of the autoclave was adjusted to 0.1 kg/cm$^2$.G and hydrogen was added in an amount corresponding to 0.2 kg/cm$^2$. Then, 0.5 kg of liquefied propylene was fed under pressure, stirring was started and the inner temperature of the autoclave was elevated to 80° C. Propylene was polymerized at this temperature for 1.5 hours.

After termination of the polymerization, stirring was stopped and unreacted propylene in the system was discharged, and the formed polymer was recovered. It was found that the amount of the formed polymer was 149 g and the activity was 17,200 g/g, which corresponded to a Ti activity of 400 kg/g. When the properties of the polymer particles were measured, it was found that the MFR was 4.3, II was 96.5, the bulk density was 0.45 g/cm$^3$, the average particle diameter was 750 μm, σ was 0.11, and the fine particle content was 0% by weight.

EXAMPLES 16 THROUGH 19

Solid catalyst components (A) were prepared in the same manner as described in (a) of Example 15 except that phenyltriethoxysilane in Example 16, tetramethoxysilane in Example 17, dimethylpolysiloxane (having a viscosity of 200 cst as measured at 25° C.) in Example 18 and methylphenylpolysiloxane in Example 19 were used in amounts shown in Table 4 instead of diphenyldimethoxysilane used in (a) of Example 15.

Propylene was polymerized in the same manner as described in (b) of Example 15 by using the so-obtained solid catalyst components (A), respectively, and triethyl aluminum and ethyl benzoate. The results are shown in Table 4.

COMPARATIVE EXAMPLE 5

By using the same apparatus as used in (a) of Example 15, an Mg-Ti solution was prepared under the same conditions as adopted in Example 15 except that ethyl benzoate was not used as the reactant. A flask having an inner volume of 500 ml was charged with 0.053 mole, as calculated as Mg, of the Mg-Ti solution, the temperature was elevated to 45° C., and a 50% hexane solution of 96.6 g i-butyl aluminum dichloride was added to the Mg-Ti solution over a period of 2 hours. After completion of the addition, the temperature was elevated to 70° C. and the mixture was stirred for 1 hour.

Hexane was added to the reaction product and washing was conducted 15 times by decantation to obtain a slurry of a solid catalyst component (A) suspended in hexane. An elementary analysis proved that the Ti content was 18.3% by weight.

Propylene was polymerized by using the so-obtained solid catalyst component, triethyl aluminum and ethyl benzoate in the same manner as described in (b) of Example 15.

COMPARATIVE EXAMPLE 6

A hexane slurry containing a solid product was prepared in the same manner as described in Comparative Example 5 by using 0.053 mole, as calculated as Mg, of the Mg-Ti solution obtained in Comparative Example 5 and a 50% hexane solution of 96.6 g of i-butyl aluminum dichloride. Then, all of a solution obtained by diluting 52.4 ml of titanium tetrachloride with 52.4 ml of 1,2-dichloroethane was added to the hexane slurry, reaction was carried out for 4 hours, and the reaction mixture was stirred at 70° C. for 1 hour. The solid portion was collected by filtering the reaction mixture and was suspended in a mixture of 52.4 ml of titanium tetrachloride and 52.4 ml of 1,2-dichloroethane again, and the suspension was stirred at 70° C. for 1 hour.

Hexane was added to the product and washing conducted 15 times by decantation to obtain a slurry of a solid catalyst component (A) suspended in hexane.

Propylene was polymerized by using the obtained solid catalyst component (A), triethyl aluminum, and ethyl benzoate in the same manner as described in (b) of Example 15. The results are shown in Table 4.

TABLE 4

| | Results of polymerization of propylene | | | | | | | |
|---|---|---|---|---|---|---|---|---|
| | Activity (g/g) | Ti activity (kg/g) | MFR (g/10 min) | II (%) | Bulk density (g/cm$^3$) | Average particle diameter (μm) | σ | Fine particle content (%) |
| Example 15 | 17,200 | 400 | 4.3 | 96.5 | 0.45 | 750 | 0.11 | 0 |
| Example 16 | 22,800 | 556 | 3.9 | 96.0 | 0.43 | 680 | 0.09 | 0 |
| Example 17 | 18,400 | 449 | 3.9 | 96.7 | 0.40 | 710 | 0.12 | 0 |
| Example 18 | 17,200 | 465 | 4.5 | 97.2 | 0.41 | 520 | 0.10 | 0 |
| Example 19 | 20,000 | 513 | 3.6 | 96.7 | 0.42 | 580 | 0.11 | 0 |
| Comparative Example 5 | 1,700 | 9.3 | 9.9 | 88.0 | 0.25 | 200 | 0.30 | 7.1 |
| Comparative Example 6 | 3,700 | 17.6 | 7.6 | 91.0 | 0.27 | 220 | 0.34 | 6.8 |

EXAMPLES 20 THROUGH 22

Solid catalyst components (A) were prepared in the same manner as described in (a) of Example 15 except that a 50% decane solution of ethyl aluminum dichloride in Example 20, a 50% decane solution of ethyl aluminum sesquichloride in Example 21, and a 50% 1,2-dichloroethane solution of i-butyl aluminum dichloride in Example 22 were used in the amounts shown in Table 5 instead of i-butyl aluminum dichloride used in (a) of Example 15.

Propylene was polymerized by using the so-obtained solid catalyst components (A), respectively, and triethyl aluminum and ethyl benzoate, in the same manner as described in (b) of Example 15. The results are shown in Table 5.

EXAMPLES 23 THROUGH 26

By using the solid catalyst component (A) obtained in (a) of Example 15, 1.00 millimole of triethyl aluminum and 0.25 millimole of diethyl aluminum chloride as the catalyst component (B), and a catalyst component (C) shown in Table 6, propylene was polymerized in the same manner as described in (b) of Example 15. The results are shown in Table 6.

aluminum, diethyl aluminum chloride and diphenyldimethoxysilane. The results are shown in Table 7.

EXAMPLES 30 AND 31

Solid catalyst components (A) were prepared in the same manner as described in (a) of Example 15 except that instead of ethyl benzoate used twice in amounts of 0.099 mole and 0.012 mole in (a) of Example 15, there were the same molar amount of diisobutyl phthalate was used in Example 30 and of butyl ether was used Example 31.

Propylene was polymerized by using the so-obtained solid catalyst components (A), respectively, and triethyl aluminum and diphenyldimethoxysilane in the same manner as described in Example 23. The results are shown in Table 7.

TABLE 7

| | Results of polymerization of propylene | | | | | | | |
|---|---|---|---|---|---|---|---|---|
| | Activity (g/g) | Ti activity (kg/g) | MFR (g/10 min) | II (%) | Bulk density (g/cm$^3$) | Average particle diameter (μm) | σ (—) | Fine particle content (%) |
| Example 27 | 25,000 | 500 | 5.0 | 97.6 | 0.40 | 710 | 0.12 | 0.5 |
| Example 28 | 28,000 | 636 | 5.4 | 97.7 | 0.39 | 690 | 0.10 | 0.9 |
| Example 29 | 29,300 | 666 | 6.0 | 97.0 | 0.39 | 620 | 0.12 | 0.2 |
| Example 30 | 30,000 | 789 | 4.2 | 98.9 | 0.44 | 830 | 0.10 | 0 |
| Example 31 | 21,500 | 672 | 4.8 | 98.1 | 0.43 | 590 | 0.13 | 1.0 |

TABLE 5

| | Aluminum halide compound as reactant (v) | | Results of polymerization of propylene | | | | | | |
|---|---|---|---|---|---|---|---|---|---|
| | Kind | Amount used (g) | Activity (g/g) | Ti activity (kg/g) | MFR (g/10 min) | II (%) | Bulk density (g/cm$^3$) | Average particle diameter (μm) | σ | Fine particle content (%) |
| Example 20 | Ethyl aluminum dichloride | 12.2 | 20,200 | 404 | 3.8 | 96.0 | 0.43 | 710 | 0.10 | 0.2 |
| Example 21 | Ethyl aluminum sesquichloride | 23.8 | 19,800 | 521 | 4.0 | 95.6 | 0.40 | 590 | 0.13 | 0.3 |
| Example 22 | i-Butyl aluminum dichloride | 14.9 | 24,500 | 613 | 4.5 | 96.8 | 0.45 | 680 | 0.10 | 0 |

TABLE 6

| | Kind of catalyst component (C) | Results of polymerization of propylene | | | | | | |
|---|---|---|---|---|---|---|---|---|
| | | Activity (g/g) | Ti activity (kg/g) | MFR (g/10 min) | II (%) | Bulk density (g/cm$^3$) | Average particle diameter (μm) | σ | Fine particle content (%) |
| Example 23 | Diphenyldimethoxysilane | 32,000 | 744 | 4.4 | 98.1 | 0.45 | 740 | 0.10 | 0 |
| Example 24 | Phenyltriethoxysilane | 30,000 | 698 | 4.5 | 97.6 | 0.44 | 730 | 0.12 | 0 |
| Example 25 | Methyl p-toluylate | 19,800 | 495 | 5.0 | 96.2 | 0.43 | 580 | 0.10 | 0.1 |
| Example 26 | Ethyl p-anisate | 20,200 | 532 | 3.9 | 96.6 | 0.44 | 620 | 0.13 | 0.2 |

EXAMPLES 27 THROUGH 29

Solid catalyst components (A) were prepared in the same manner as described in Example 15 except that 2.6 moles of n-butanol in Example 27, 2.6 moles of n-octanol in Example 28 and 1.3 moles of n-butanol, and 1.3 moles of i-propanol in Example 29 were used instead of 2-ethylhexanol used in (a) of Example 15.

Propylene was polymerized under the same conditions as adopted in Example 23 by using the so-obtained solid catalyst components (A), respectively, and triethyl

EXAMPLE 32

Polymerization was carried out in the gas phase by using the solid catalyst component (A) prepared in Example 30. A stainless steel autoclave having an inner volume of 5 l and provided with an electromagnetic stirrer was charged with 50 g of polypropylene powder having a bulk density of 0.34 g/cm$^3$ and an MFR of 6 g/10 min, and deaeration drying was carried out at 70° C. for 2 hours. The inner atmosphere of the autoclave was substituted with nitrogen, and the inner temperature was adjusted to 60° C. Then, triethyl aluminum and diethyl aluminum chloride as the catalyst component (B), diphenyldimethoxysilane as the catalyst component (C), and the solid catalyst component (A) prepared in Example 30 were added in sequence in the same amounts as used in Example 23. The inner pressure of the reaction vessel was adjusted to 0.1 kg/cm$^2$.G and hydrogen was added in an amount corresponding to 0.3 kg/cm$^2$, and polymerization was carried out for 1 hour while continuously feeding propylene so that the total pressure was maintained at 10.4 kg/cm$^2$.G.

It was found that 150 g of polypropylene having an MFR of 4.6 and a bulk density of 0.44 was obtained.

EXAMPLE 33

The inner atmosphere of a stainless steel autoclave having an inner capacity of 5 l and provided with an electromagnetic stirrer was substituted with nitrogen, and triethyl aluminum and diethyl aluminum chloride as the catalyst component (B), diphenyldimethoxysilane as the catalyst component (C), and the solid catalyst component (A) obtained in Example 30 were charged in the same amounts as used in Example 23 into the autoclave. Then, 1.25 kg of liquefied propylene was fed under pressure and stirring was started, and ethylene was added in an amount corresponding to 2.0 kg/cm$^2$. The inner temperature of the autoclave was elevated to 50° C. and polymerization was carried out for 1 hour while continuously feeding ethylene so that the inner pressure of the autoclave was maintained at 28 kg/cm$^2$.G, to obtain 166 g of a propylene/ethylene random copolymer. When the ethylene content in the copolymer was determined by the infrared absorption spectroscopy, it was found that the ethylene content was 43% by weight.

EXAMPLE 34

(a) Preparation of Solid Catalyst Component (A)

An autoclave having an inner volume of 2 l and provided with a stirrer was charged with 12 g (0.49 mole) of metallic magnesium powder, and 0.6 g of iodine, 334.3 g (2.6 moles) of 2-ethylhexanol, 168.0 g (0.49 mole) of titanium tetrabutoxide and 14.8 g (0.099 mole) of ethyl benzoate were added into the autoclave. Then, 1 l of decane was added to the mixture, the temperature was elevated to 90° C., and the mixture was stirred for 1 hour under sealing with nitrogen while removing generated hydrogen gas. Subsequently, the temperature was elevated to 140° C. and a reaction was carried out for 1 hour to obtain a homogeneous solution containing magnesium and titanium (Mg-Ti solution).

A flask having an inner volume of 500 ml was charged with 0.048 mole, as calculated as Mg, of the Mg-Ti solution, and the solution was rapidly cooled to −20° C. and a solution obtained by diluting 14.9 g of i-butyl aluminum dichloride to a concentration of 50% with decane was added over a period of 2 hours. After completion of the solution, the temperature was elevated to room temperature to obtain a slurry of a white solid product. The temperature of the slurry containing the white solid product was elevated to 60° C., and 500 ppm of sorbitan distearate was added to the slurry. Then, 1.8 g (0.012 mole) of ethyl benzoate was added, all of a solution obtained by diluting 47 ml of titanium tetrachloride with 47 ml of 1,2-dichloroethane was added, and a reaction was carried out for 4 hours. Agglomeration of the solid product did not occur during the reaction. The reaction mixture was stirred at 70° C. for 1 hour. The solid portion was collected by filtering the reaction mixture and was suspended in a mixture of 47 ml of titanium tetrachloride and 47 ml of 1,2-dichloroethane again, and the suspension was stirred at 70° C. for 1 hour. Hexane was added to the product and washing was conducted until the free titanium compound could not be detected, whereby a slurry of a solid catalyst component (A) suspended in hexane was obtained. The supernatant was removed and the residue was dried in a nitrogen atmosphere. An elementary analysis proved that the Ti content was 5.9% by weight.

(b) Polymerization of Propylene

The inner atmosphere of a stainless steel autoclave having an inner volume of 2 l and provided with an electromagnetic stirrer was substituted with nitrogen, and 1.25 millimoles of triethyl aluminum as the catalyst component (B), 0.313 millimole of ethyl benzoate as the catalyst component (C), and 0.0063 millimole, as calculated as Ti, of the solid catalyst component (A) obtained in (a) above were added in sequence. The inner pressure of the autoclave was adjusted to 0.1 kg/cm$^2$.G and hydrogen was added in an amount corresponding to 0.2 kg/cm$^2$, and 0.5 kg of liquefied propylene was fed under pressure. Stirring was started, the inner temperature of the autoclave was elevated to 65° C., and propylene was polymerized at this temperature for 1.5 hours.

After termination of the polymerization reaction, stirring was stopped and unreacted propylene in the system discharged, and the formed polymer was recovered. It was found that the amount of the formed polymer was 220 g and the activity was 43,000 g/g, which corresponded to a Ti activity of 729 kg/g. When the properties of polymer particles were measured, it was found that MFR was 4.3, II was 97.0, the bulk density was 0.45 g/cm$^3$, the average particle diameter was 350 μm, and σ was 0.10. Note, fine particles were not detected in the polymer particles.

COMPARATIVE EXAMPLE 7

The same apparatus as used in (a) of Example 1 was charged with 12.2 g (0.5 mole) of metallic magnesium, and 0.6 g of iodine, 340 g (2.6 moles) of 2-ethylhexanol and 15.0 g (0.1 mole) of ethyl benzoate were added and 1 l of decane was further added. The temperature was elevated to 90° C. and the mixture was stirred for 1 hour under sealing with nitrogen while removing generated hydrogen gas. Subsequently, the temperature was elevated to 140° C. and a reaction was carried out for 1 hour to obtain a greyish white slurry. The product was collected in an amount of 0.048 mole, as calculated as Mg, from the slurry, and in the same manner as described in (a) of Example 34, the recovered product was reacted with i-butyl aluminum dichloride and then with sorbitan distearate, ethyl benzoate, titanium tetrachloride and 1,2-dichloroethane to obtain a solid catalyst component (A). The Ti content in the solid catalyst component (A) was 5.1% by weight.

By using this solid catalyst component (A), propylene was polymerized in the same manner as described in (b) of Example 1. It was found that the activity was 15,900 g/g, which corresponded to a Ti activity of 312 kg/g, MFR was 4.3, II was 94.0, the bulk density was 0.22 g/cm$^3$, the average particle diameter was 300 μm, σ was 0.50 and the fine particle content was 24% by weight.

EXAMPLES 35 THROUGH 39

Solid catalyst components (A) were prepared in the same manner as described in Example 34 except that compounds shown in Table 8 were used instead of sorbitan distearate used as the surface active agent in Example 34.

Propylene was polymerized by using the so-obtained solid catalyst components (A), respectively, and triethyl aluminum and ethyl benzoate in the same manner as described in (b) of Example 34. The results are shown in Table 8.

TABLE 8

| | Surface active agent | Results of polymerization of propylene | | | | | | | |
|---|---|---|---|---|---|---|---|---|---|
| | | Activity (g/g) | Ti activity (kg/g) | MFR (g/10 min) | II (%) | Bulk density (g/cm$^3$) | Average particle diameter ($\mu$m) | $\sigma$ | Fine particle content (%) |
| Example 34 | Sorbitan distearate | 43,000 | 729 | 4.3 | 97.0 | 0.45 | 350 | 0.10 | 0 |
| Example 35 | Sorbitan monostearate | 42,000 | 710 | 3.7 | 97.2 | 0.46 | 380 | 0.09 | 0 |
| Example 36 | Sorbitan tristearate | 44,000 | 750 | 5.0 | 96.8 | 0.44 | 340 | 0.11 | 0 |
| Example 37 | Sorbitan mono-oleate | 39,000 | 780 | 3.9 | 97.0 | 0.42 | 280 | 0.10 | 0 |
| Example 38 | Sorbitan sesqui-oleate | 41,000 | 760 | 3.2 | 96.7 | 0.45 | 290 | 0.10 | 0 |
| Example 39 | Perfluoroalkyl ethylene oxide adduct | 39,000 | 740 | 3.1 | 96.5 | 0.44 | 300 | 0.12 | 0 |

EXAMPLES 40 THROUGH 42

Solid catalyst components (A) were prepared in the same manner as described in (a) of Example 34 except that methyl p-toluylate in Example 40, ethyl p-anisate in Example 41 or diisobutyl phthalate in Example 42 was used twice (0.099 mole and 0.012 mole) instead of ethyl benzoate used twice (0.099 mole and 0.012 mole) in (a) of Example 34 and 1000 ppm of sorbitan distearate was used.

By using the so-obtained solid catalyst components (A), respectively, 1.00 millimole of triethyl aluminum and 0.25 millimole of diethyl aluminum chloride as the catalyst component (B) and 0.313 millimole of diphenyldimethoxysilane as the catalyst component (C), propylene was polymerized in the same manner as described in (b) of Example 34 except that the inner temperature of the autoclave was adjusted to 80° C. The results are shown in Table 9.

EXAMPLE 43

Polymerization was carried out in the same manner as described in Example 42 except that phenyltriethoxysilane was used as the catalyst component (C) instead of diphenyldimethoxysilane used in Example 42. The results are shown in Table 9.

EXAMPLE 44

(a) Preparation of Solid Catalyst Component (A)

An autoclave having an inner volume of 2 l and provided with a stirrer was charged with 12 g (0.49 mole) of metallic magnesium powder, and 0.6 g of iodine, 334.4 g (2.6 moles) of 2-ethylhexanol, 168.0 g (0.49 mole) of titanium tetrabutoxide and 14.8 g (0.099 mole) of ethyl benzoate were added and 1 l of decane was further added. The temperature was elevated to 90° C. and the mixture was stirred for 1 hour under sealing with nitrogen while removing generated hydrogen gas.

Subsequently, the temperature was elevated to 140° C. and a reaction was carried out for 1 hour, and 29.3 g (0.12 mole) of diphenyldimethoxysilane was added over a period of 30 minutes. The mixture was stirred at 140° C. for 1 hour to obtain a homogeneous solution containing magnesium, titanium and silicon (hereinafter referred to as "Mg-Ti solution").

The Mg-Ti solution was collected in an amount of 0.048 mole as calculated as Mg and reacted in the same manner as described in Example 42 to obtain a solid catalyst component (A).

(b) Polymerization of Propylene

Propylene was polymerized by using the so-obtained solid catalyst component (A), triethyl aluminum, diethyl aluminum chloride, and diphenyldimethoxysilane in the same manner as described in Example 42.

It was found that the activity was 33,000 g/g, which corresponded to a Ti activity of 892 kg/g. When the properties of polymer particles were measured, it was found that the MFR was 4.1, II was 99.2, the bulk density was 0.47 g/cm$^3$, the average particle diameter was 800 $\mu$m, $\sigma$ was 0.08, and the fine particle content was 0% by weight.

TABLE 9

| | Results of polymerization of propylene | | | | | | | |
|---|---|---|---|---|---|---|---|---|
| | Activity (g/g) | Ti activity (kg/g) | MFR (g/10 min) | II (%) | Bulk density (g/cm$^3$) | Average particle diameter ($\mu$m) | $\sigma$ | Fine particle content (%) |
| Example 40 | 42,000 | 955 | 4.3 | 97.3 | 0.45 | 410 | 0.11 | 0 |
| Example 41 | 45,000 | 1125 | 5.0 | 97.5 | 0.46 | 380 | 0.11 | 0 |
| Example 42 | 54,000 | 1800 | 3.9 | 99.3 | 0.48 | 360 | 0.10 | 0 |
| Example 43 | 58,900 | 1590 | 4.0 | 99.4 | 0.47 | 320 | 0.08 | 0 |

EXAMPLE 45

Polymerization was carried out in the gas phase by using the solid catalyst component (A) prepared in Example 42. A stainless steel autoclave having an inner volume of 5 l and provided with an electromagnetic stirrer was charged with 50 g of polypropylene powder having a bulk density of 0.34 g/cm$^3$ and MFR of 6 g/10 min and deaeration drying was carried out at 70° C. for 2 hours. The inner atmosphere of the autoclave was substituted with nitrogen and the inner temperature was adjusted to 60° C. Then, triethyl aluminum and diethyl aluminum chloride as the catalyst component (B), diphenyldimethoxysilane as the catalyst component (C) and the solid catalyst component (A) prepared in Example 42 were charged in succession in the same amounts as used in Example 42. The inner pressure of the reaction vessel was adjusted to 0.1 kg/cm$^2$.G and hydrogen was added in an amount corresponding to 0.3 kg/cm$^2$, and polymerization was carried out for 1 hour while continuously feeding propylene so that the total pressure was 10.4 kg/cm$^2$.G.

As the result, 230 g of polypropylene having an MFR of 4.3 and a bulk density of 0.45 was obtained.

EXAMPLE 46

The inner atmosphere of a stainless steel autoclave having an inner volume of 5 l and provided with an electromagnetic stirrer was substituted with nitrogen, and triethyl aluminum and diethyl aluminum chloride as the catalyst component (B), diphenyldimethoxysilane as the catalyst component (C), and the solid catalyst component (A) prepared in Example 42 were charged in the same amounts as used in Example 42 into the autoclave. Then, 1.25 kg of liquefied propylene was fed under pressure into the autoclave, stirring was started, and ethylene was added in an amount corresponding to 2.0 kg/cm$^2$. The inner temperature of the autoclave was elevated to 50° C. and polymerization was carried out while continuously feeding ethylene into the autoclave so that the inner pressure of the autoclave was 28 kg/cm$^2$.G, whereby 255 g of a propylene/ethylene random copolymer was obtained. When the ethylene content in the obtained copolymer was determined by the infrared absorption spectroscopy, it was found that the ethylene content was 46% by weight.

EXAMPLE 47

(A) Preparation of Solid Catalyst Component (A)

The same apparatus as used in (a) of Example 1 was charged with 12.2 g (0.5 mole) of metallic magnesium, and 0.6 g of iodine, 340 g (2.6 moles) of 2-ethylhexanol, 121.3 g (0.5 mole as titanium atom) of titanium tetrabutoxide tetramer and 15.0 g (0.1 mole) of ethyl benzoate were added and 1 l of decane was further added. The temperature was elevated to 90° C. and the mixture was stirred for 1 hour under sealing with nitrogen while removing generated hydrogen gas. Subsequently, the temperature was elevated to 140° C. and reaction was carried out for 1 hour to obtain an Mg-Ti solution.

A flask having an inner volume of 500 ml was charged with 0.048 mole, as calculated as Mg, of the Mg-Ti solution, and the temperature was elevated to 45° C. and a solution obtained by diluting 14.9 g of i-butyl aluminum dichloride to a concentration of 50% with decane was added over a period of 2 hours. After completion of the addition, the temperature was elevated to 70° C. to obtain a slurry containing a white solid product. The slurry was washed with decane three times and all of a solution obtained by diluting 47 ml of titanium tetrachloride with 47 ml of 1,2-dichloroethane was added, and reaction was carried out at 90° C. for 4 hours. The solid portion was recovered by filtering the reaction mixture and 100 ml of decane was added to the solid portion to form a slurry. Then, 500 ppm of sorbitan distearate and 1.8 g (0.012 mole) of ethyl benzoate were added to the slurry. Then, all of a solution obtained by diluting 47 ml of titanium tetrachloride with 47 ml of 1,2-dichloroethane was added to the mixture and reaction was carried out at 90° C. for 4 hours. After the reaction, hexane was added to the reaction mixture and washing was sufficiently performed until the free titanium compound was not detected, whereby a slurry of a solid catalyst component (A) suspended in hexane was obtained. It was found that the Ti content in the solid catalyst component (A) was 6.9% by weight.

(b) Polymerization of Propylene

By using the so-obtained solid catalyst component (A), propylene was polymerized in the same manner as described in (b) of Example 1. It was found that the activity was 39,000 g/g, which corresponded to a Ti activity of 565 kg/g, the MFR was 4.3, II was 96.7, the bulk density was 0.44 g/cm$^3$, the average particle diameter was 290 μm, σ was 0.11, and the fine particle content was 0% by weight.

EXAMPLE 48

(a) Preparation of Solid Catalyst Component (A)

A flask having an inner volume of 500 ml was charged with 5.7 g (0.05 mole) of magnesium ethoxide, and 20.8 g (0.16 mole) of 2-ethylhexanol, 17.0 g (0.05 mole) of titanium tetrabutoxide and 1.50 g (0.01 mole) of ethyl benzoate were added and 100 ml of decane was further added. Then, reaction was carried out at 140° C. for 5 hours to obtain an Mg-Ti solution. The reaction mixture was cooled to 45° C. and a solution obtained by diluting 15.5 g of i-butyl aluminum dichloride to a concentration of 50% with decane was added over a period of 2 hours. After completion of the addition, the temperature was elevated to 70° C. to obtain a slurry containing a white solid product. The obtained slurry containing the white solid product was maintained at 60° C. and 500 ppm of sorbitan distearate was added thereto. Then, 1.88 g (0.0125 mole) of ethyl benzoate was added to the slurry and all of a solution obtained by diluting 47 ml of titanium tetrachloride with 47 ml of 1,2-dichloroethane was added, a reaction was carried out for 4 hours, and the reaction mixture was stirred at 70° C. for 1 hour. The solid portion was collected by filtering the reaction mixture and was suspended in a mixture of 47 ml of titanium tetrachloride and 47 ml of 1,2-dichloroethane again, and the suspension was stirred at 70° C. for 1 hour. Hexane was added to the reaction mixture and washing was conducted until the free titanium compound could not be detected, whereby a slurry of a solid catalyst component (A) suspended in hexane was obtained. The supernatant was removed and the residue was dried in a nitrogen atmosphere. An elementary analysis proved that the Ti content was 6.0% by weight.

(b) Polymerization of Propylene

Propylene was polymerized in the same manner as described in (b) of Example 1 except that the solid catalyst component (A) obtained in (a) above was used in an amount of 0.0063 millimole as calculated as Ti, 1.25 millimoles of triethyl aluminum was used as the catalyst component (B), and 0.313 millimol of 2,2,6,6-tetramethylpiperidine was used as the catalyst component (C).

As the result, it was found that the activity was 35,400 g/g, which corresponded to a Ti activity of 580 kg/g, II was 95.7, the bulk density was 0.42 g/cm$^3$, the average particle diameter was 280 μm, σ was 0.12, and the fine particle content was 0.1% by weight.

INDUSTRIAL APPLICABILITY

The first effect of the present invention is that the polymerization activity of the used catalyst is very high and a polymer, for which the ash-removing step for removing the residual catalyst is not necessary, is obtained. Since the activity of the catalyst is high, there is no risk of discoloration of the product or generation of a bad smell and purification of the polymer is not necessary, and therefore, the present invention is very advantageous from the economical viewpoint.

The second effect of the present invention is that the stereoregularity of the obtained polymer is very good. Therefore, the present invention is advantageously applied to the preparation of a polymer by the gas phase polymerization not using a reaction medium.

The third effect of the present invention is that the powder characteristics of the obtained polymer are highly improved. Namely, a polymer in which the particle size distribution is very narrow, the fine particle content is low, the average particle size is appropriate, and the bulk density is high is obtained according to the present invention. Use of the reactants (vii) and (viii) is especially preferred for improving the powder characteristics. These characteristics are very significant from an industrial viewpoint. Namely, formation of a substance adhering to the polymerization apparatus is prevented at the polymerization step, and scattering of fine particles is prevented at the step of separating or drying the polymer. Moreover, the drying efficiency is increased by the improvement of the flowability. Furthermore, bridging is not caused in a silo at the transporting step and transportation troubles can be eliminated. In addition, a polymer having a certain quality can be supplied.

The fourth effect of the present invention is that the copolymerizability is improved. Namely, in the copolymerization, formation of a waxy polymer is controlled and a copolymer having a high quality can be efficiently prepared without a substantial reduction of the powder characteristics of the polymer.

We claim:

1. A process for preparing a stereoregular polyolefin by homopolymerizing or copolymerizing as a main component α-olefin having at least 3 carbon atoms in the presence of a catalyst comprising a transition metal compound and an organometallic compound, wherein a catalyst system comprising (A) a solid catalyst component obtained by reacting a homogeneous solution containing (i) a combination of metallic magnesium and a hydroxyl hydrocarbon compound, (ii) an electron donor compound and (iii) an oxygen-containing organic compound of titanium of the formula $$(TiO, (OR^5)b)m$$

wherein R is a hydrocarbon group having 1 to 20 carbon atoms, a and b are numbers satisfying the requirements of a $\geq 0$ and b$>$0 and compatible with the valency of titanium, and m is an integer with (iv) at least one aluminum halide compound and further reacting the obtained solid product with (v) an electron donor compound and (vi) a titanium halide compound in the presence of an inert organic solvent, (B) at least one member selected from the group consisting of organometallic compounds of metals of the groups Ia, IIa, IIb, IIIb and IVb of the periodic table, and (C) an electron donor compound is used.

2. A process according to claim 1, wherein the aluminum halide compound (iv) is a compound represented by the following general formula:

$$AlR^1_xX_{3-n}$$

wherein R$^1$ stands for an alkyl group having 1 to 20 carbon atoms, X stands for a halogen atom, and n is a number in the range of 0$>$n$\geq$2.

3. A process according to claim 1, wherein each of the electron donor compounds (ii) and (v) is an organic acid ester.

4. A process according to claim 1, wherein the electron donor compound as the component (C) is an organic acid ester.

5. A process according to claim 1, wherein the electron donor compound ass the component (C) is an oxygen-containing organic compound of silicon.

6. A process according to claim 1, wherein the electron donor compound as the component (C) is a nitrogen-containing organic compound.

7. A process according to claim 1 wherein the homogeneous solution contains (i) a combination of metallic magnesium and a hydroxyl hydrocarbon compound, (ii) an electron donor compound (vii) at least one silicon compound selected from the group consisting of polysiloxanes and silanes and (iii) an oxygen-containing organic compound of titanium of the formula $$(TiO, (OR^5)b)m$$

wherein R is a hydrocarbon group having 1 to 20 carbon atoms, a and b are numbers satisfying the requirements of a $\geq 0$ and b$>$0 and compatible with the valency of titanium, and m is an integer.

8. A process according to claim 1, wherein the component (A) is a solid catalyst component obtained by reacting said solid product with (viii) a surface active agent, (v) an electron donor compound and (vi) a titanium halide compound.

9. A process according to claim 8, wherein the surface active agent is a non-ionic surface active agent.

10. A process according to claim 1, wherein electron donor compounds (ii) and (v) are ethyl benzoate, (vi) is titanium tetrachloride and 1,2-dichloroethane, and (iii) is titanium tetrabutoxide.

* * * * *